(12) United States Patent
Kwon et al.

(10) Patent No.: US 9,991,943 B2
(45) Date of Patent: Jun. 5, 2018

(54) INTERFERENCE CANCELLATION REPEATER AND SIGNAL ATTENUATION METHOD THEREOF

(71) Applicant: SOLID, INC., Seongnam-si, Gyeonggi-do (KR)

(72) Inventors: Nagwon Kwon, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days. days.

(21) Appl. No.: 15/395,123

(22) Filed: Dec. 30, 2016

(65) Prior Publication Data

US 2017/0195036 A1    Jul. 6, 2017

(30) Foreign Application Priority Data

Dec. 31, 2015 (KR) .................. 10-2015-0191004

(51) Int. Cl.
| | | |
|---|---|---|
| H04B 15/00 | (2006.01) | |
| H04B 7/155 | (2006.01) | |
| H04B 7/185 | (2006.01) | |
| H04W 72/04 | (2009.01) | |
| H04W 72/08 | (2009.01) | |

(52) U.S. Cl.
CPC ..... H04B 7/15585 (2013.01); H04B 7/15535 (2013.01); H04B 7/15542 (2013.01); H04B 7/18543 (2013.01); H04W 72/0473 (2013.01); H04W 72/082 (2013.01)

(58) Field of Classification Search
CPC ............ H04B 7/15535; H04B 7/15542; H04B 7/15585; H04B 7/18543; H04W 72/0473; H04W 72/082

USPC ........... 455/13.3, 9, 11.1, 24; 370/315, 252; 375/211, 259
See application file for complete search history.

(56) References Cited

U.S. PATENT DOCUMENTS

| | | | | |
|---|---|---|---|---|
| 2005/0130587 A1* | 6/2005 | Suda | ................... | H04B 7/15564 455/9 |
| 2005/0191961 A1* | 9/2005 | Kunieda | ................... | H04B 3/23 455/24 |
| 2007/0129008 A1* | 6/2007 | Shi | ..................... | H04B 7/15585 455/11.1 |
| 2007/0135042 A1* | 6/2007 | Shiff | ..................... | H01Q 1/2208 455/13.3 |
| 2007/0135125 A1* | 6/2007 | Kim | ..................... | H04B 1/7105 455/436 |
| 2007/0147525 A1* | 6/2007 | Song | .................. | H04L 27/2647 375/260 |
| 2009/0125793 A1* | 5/2009 | Kishigami | .............. | H04L 1/005 714/794 |

(Continued)

*Primary Examiner* — Tan H Trinh
(74) *Attorney, Agent, or Firm* — Sughrue Mion, PLLC

(57) ABSTRACT

An interference cancellation repeater including a subtractor configured to subtract an estimated signal from a digital reception signal and output an interference canceled signal; a first power calculator configured to calculate power of the digital reception signal; a second power calculator configured to calculate power of the interference canceled signal; and an attenuation controller configured to compare a power value of the calculated digital reception signal with a power value of the calculated interference canceled signal and determine an attenuation value of the interference canceled signal according to the comparison result.

10 Claims, 4 Drawing Sheets

(56) References Cited

U.S. PATENT DOCUMENTS

| | | | | |
|---|---|---|---|---|
| 2010/0105317 A1* | 4/2010 | Palanki | ............... | H04L 5/16 |
| | | | | 455/9 |
| 2010/0284447 A1* | 11/2010 | Gore | ............. | H04B 7/15585 |
| | | | | 375/211 |
| 2011/0116392 A1* | 5/2011 | Barriac | ........... | H04B 7/15585 |
| | | | | 370/252 |
| 2011/0143655 A1* | 6/2011 | Ahn | ............. | H04B 7/15542 |
| | | | | 455/9 |
| 2011/0286500 A1* | 11/2011 | Kim | ............. | H04B 7/15 |
| | | | | 375/211 |
| 2012/0045995 A1* | 2/2012 | Nakano | .......... | H04J 11/0036 |
| | | | | 455/63.1 |
| 2012/0281772 A1* | 11/2012 | Bailey | .......... | H03F 1/3247 |
| | | | | 375/259 |
| 2013/0077556 A1* | 3/2013 | Gore | ............ | H04B 7/15578 |
| | | | | 370/315 |
| 2014/0287707 A1* | 9/2014 | Suzuki | .......... | H03J 7/02 |
| | | | | 455/258 |
| 2016/0173187 A1* | 6/2016 | Oh | ............. | H04B 7/15585 |
| | | | | 370/315 |
| 2016/0182105 A1* | 6/2016 | Alavi | ............ | H04B 1/525 |
| | | | | 455/78 |
| 2017/0187448 A1* | 6/2017 | Kwon | .......... | H04B 7/15585 |
| 2017/0195073 A1* | 7/2017 | Kwon | .......... | H04B 17/40 |
| 2017/0366247 A1* | 12/2017 | Kim | ........... | H04W 28/048 |

* cited by examiner

INTERFERENCE CANCELLATION REPEATER AND SIGNAL ATTENUATION METHOD THEREOF

CROSS-REFERENCE TO RELATED APPLICATION

This application claims the benefit of Korean Patent Application No. 10-2015-0191004, filed on Dec. 31, 2015, in the Korean Intellectual Property Office, the disclosure of which is incorporated herein in its entirety by reference.

BACKGROUND

1. Field

The inventive concept relates to an interference cancellation repeater and a method of attenuating signals of the same, and more particularly, to an interference cancellation repeater and a method of attenuating signals of the same for stability of the interference cancellation repeater.

2. Description of the Related Art

A repeater is an electronic device that receives signals and amplifies the signals at a higher or higher power, and retransmits the amplified signals.

When the repeater receives the signals using an identical frequency and retransmits the amplified signals, a feedback phenomenon may occur in which the signals retransmitted from the repeater are received by the repeater again. When the signals fed back to the repeater are directly amplified without interference cancellation, the repeater may become unstable due to oscillation. As a result, an interference cancellation repeater having a function of canceling signals fed back to a repeater, that is, interference signals, is used.

A magnitude ratio of a signal input to the interference cancellation repeater and a signal input to the interference cancellation repeater again after being output from the interference cancellation repeater may be defined as a desired/undesired (D/U) ratio. There is a need for a method of attenuating signals output from the interference cancellation repeater such that the D/U ratio is in an acceptable range of the interference cancellation repeater for stability of the interference cancellation repeater.

SUMMARY

The inventive concept is directed to an interference cancellation repeater for attenuating signals output from the interference cancellation repeater for stability of the interference cancellation repeater and a method of attenuating signals of the same.

Additional aspects will be set forth in part in the description which follows and, in part, will be apparent from the description, or may be learned by practice of the presented example embodiments.

According to an aspect of the inventive concept, there is provided an interference cancellation repeater, the interference cancellation repeater includes: a subtractor configured to subtract an estimated signal from a digital reception signal and output an interference canceled signal; a first power calculator configured to calculate power of the digital reception signal; a second power calculator configured to calculate power of the interference canceled signal; and an attenuation controller configured to compare a power value of the calculated digital reception signal with a power value of the calculated interference canceled signal and determine an attenuation value of the interference canceled signal according to the comparison result.

According to an exemplary embodiment, wherein the attenuation controller may be configured to compare a difference value between the power value of the calculated digital reception signal and the power value of the calculated interference canceled signal with at least one of threshold values to determine the attenuation value.

According to an exemplary embodiment, wherein the interference cancellation repeater may further include a digital filter configured to filter the interference canceled signal output from the subtractor.

According to an exemplary embodiment, wherein the interference cancellation repeater may further include an adaptive filter configured to adaptively filter the interference canceled signal filtered by the digital filter to generate the estimated signal.

According to an exemplary embodiment, wherein the interference cancellation repeater may further include a delay unit configured to delay the interference canceled signal filtered by the digital filter and output the delayed signal to the adaptive filter.

According to an exemplary embodiment, wherein the interference cancellation repeater may further include: a digital attenuator configured to primarily attenuate the interference canceled signal according to the determined attenuation value; a digital to analog converter (DAC) configured to convert the attenuated digital signal output from the digital attenuator into an analog signal; and an analog attenuator configured to secondarily attenuate the analog signal according to the determined attenuation value.

According to another aspect of the inventive concept, there is provided an interference cancellation repeater, the interference cancellation repeater includes: a subtractor configured to subtract an estimated signal from a digital reception signal and output an interference canceled signal; a power calculator configured to calculate power of the digital reception signal and power of the interference canceled signal; an attenuation controller configured to compare a power value of the calculated digital reception signal with a power value of the calculated interference canceled signal and determine an attenuation value of the interference canceled signal according to the comparison result; a digital attenuator configured to primarily attenuate the interference canceled signal according to the determined attenuation value; a digital to analog converter (DAC) configured to convert the attenuated digital signal output from the digital attenuator into an analog signal; and an analog attenuator configured to secondarily attenuate the analog signal according to the determined attenuation value.

According to yet another aspect of the inventive concept, there is provided a method of attenuating signals of an interference cancellation repeater, the method includes: subtracting an estimated signal from a digital reception signal and outputting an interference canceled signal; calculating power of the digital reception signal; calculating power of the interference canceled signal; and comparing a power value of the calculated digital reception signal with a power value of the calculated interference canceled signal and determining an attenuation value of the interference canceled signal according to the comparison result.

According to an exemplary embodiment, wherein the determining an attenuation value of the interference canceled signal may include: comparing a difference value between the power value of the calculated digital reception signal and the power value of the calculated interference canceled signal with at least one of threshold values to determine the attenuation value.

According to an exemplary embodiment, wherein the method may further include generating a first control signal and a second control signal using the determined attenuation value; primarily attenuating the interference canceled signal in response to the first control signal; and secondarily attenuating the primarily attenuated signal in response to the second control signal.

According to the inventive concept, stability of an interference cancellation repeater may be maintained by comparing power of signals before interference cancellation with power of signals after interference cancellation and determining attenuation of output signals output from the interference cancellation repeater according to the comparison result.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
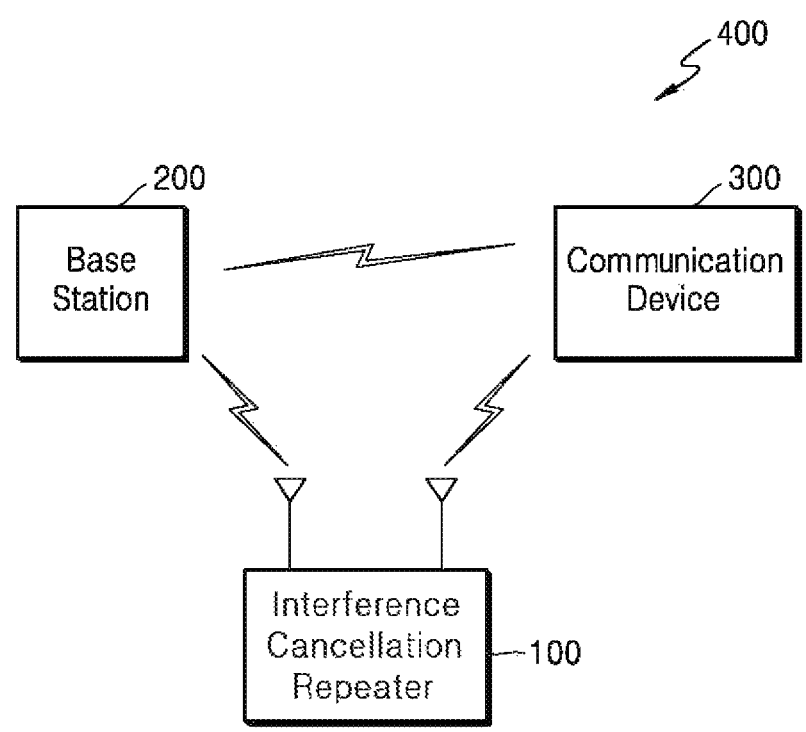
FIG. 1 is a block diagram of a wireless communication system according to an example embodiment of the inventive concept.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a block diagram of a wireless communication system 400 according to an example embodiment of the inventive concept.

Referring to FIG. 1, the wireless communication system 400 may include a frequency division duplexing (FDD) network, a frequency division multiple access (FDMA) network, an orthogonal FDMA (OFDMA) network, a code division multiple access (CDMA) network, a time division multiple access (TDMA) network, a direct sequence spread spectrum (DSSS) network, a frequency hopping spread spectrum (FHSS) network, or some other wireless communication networks. In some example embodiments, the wireless communication system 400 may be configured to operate as a second generation (2G) wireless communication network, a third generation (3G) wireless communication network, a fourth generation (4G) wireless communication network, or a long-term evolution (LTE) wireless communication network.

The wireless communication system 400 may include an interference cancellation repeater 100, a base station 200, and a communication device 300.

The base station 200 and the communication device 300 may transmit and receive signals each other. The communication device 300 is an electronic device capable of wireless communication such as a mobile phone, a smart phone, or a tablet PC. The interference cancellation repeater 100 may be used when signals between the base station 200 and the communication device 300 are not sufficient to allow voice or data communication.

The interference cancellation repeater 100 may receive signals output from the base station 200 and amplify the signals at a higher level or higher power, and then may retransmit the amplified signals to the communication device 300. The interference cancellation repeater 100 may cancel a feedback signal, that is, an interference signal, in order to prevent oscillation due to a feedback phenomenon as a signal transmitted from the interference cancellation repeater 100 is input to the interference cancellation repeater 100 again.

If the interference signal is excessively large, it may be difficult to cancel the interference signal, and if the interference signal is generated due to fading, it may be difficult to prevent oscillation of the interference cancellation repeater 100. Therefore, the interference cancellation repeater 100 needs to adjust power of signals output from the interference cancellation repeater 100 to realize stable performance of the interference cancellation repeater 100.

Figure 2:
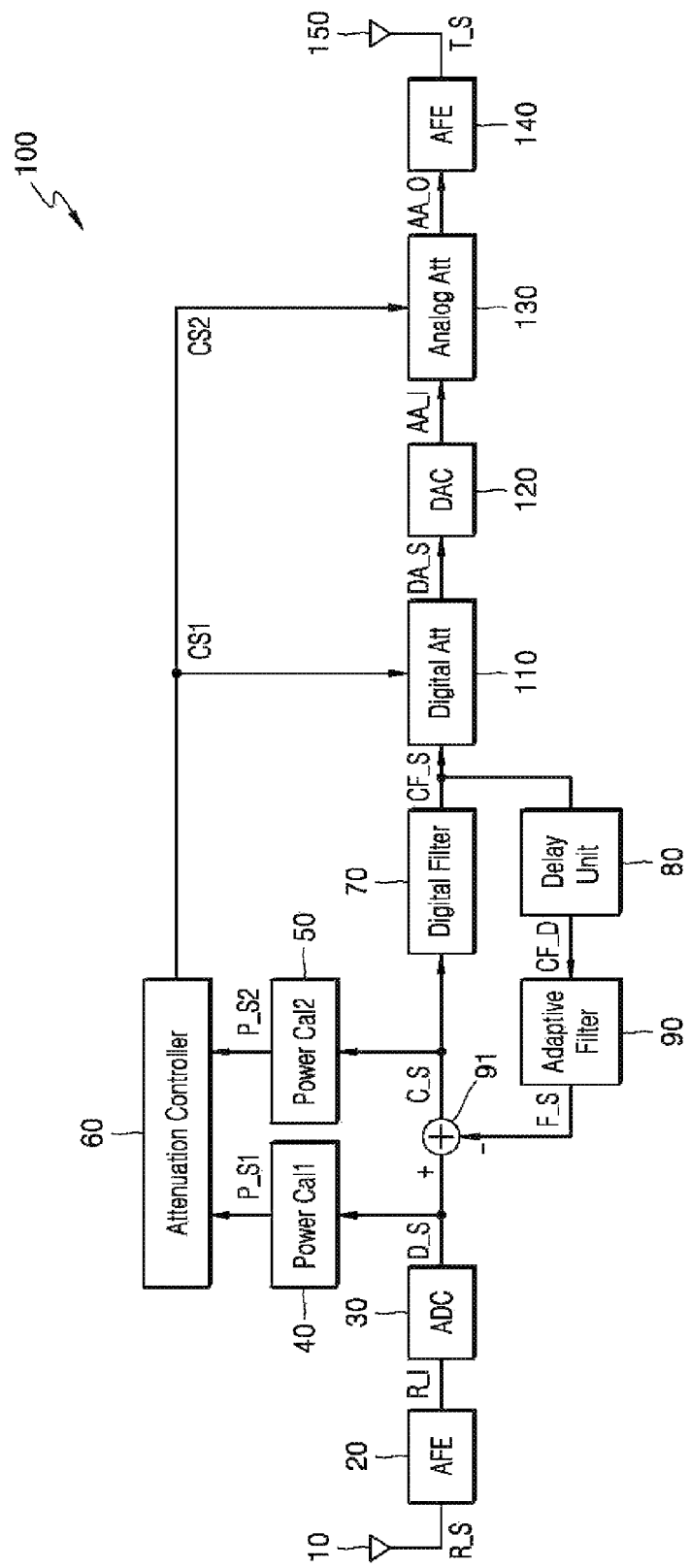
FIG. 2 is a block diagram of an interference cancellation repeater shown in FIG. 1.

FIG. 2 is a block diagram of the interference cancellation repeater 100 shown in FIG. 1.

Referring to FIGS. 1 and 2, the interference cancellation repeater 100 may include a first antenna 10, a first analog front end (AFE) 20, an analog to digital converter (ADC) 30, a first power calculator 40, a second power calculator 50, an attenuation controller 60, a digital filter 70, a delay unit 80, an adaptive filter 90, a subtractor 91, a digital attenuator 110, a digital to analog converter (DAC) 120, an analog attenuator 130, a second AFE 140, and a second antenna 150. According to an example embodiment, the interference cancellation repeater 100 may be implemented variously using different components.

The first antenna 10 receives a signal R_S transmitted from the base station 200. According to an example embodiment, the first antenna 10 may receive signals transmitted from the communication device 300. The second antenna 150 transmits a signal T_S to the communication device 300. The second antenna 150 may transmit signals to the base station 200 according to an example embodiment.

The first and second AFEs 20 and 140 are a set of analog components for performing receiving and transmitting functions of the interference cancellation repeater 100. Each of the first and second AFEs 20 and 140 may include a variable gain amplifier (VGA) (not shown), a power amplifier (PA) (not shown), a filter (not shown), a mixer (not shown), or a driver (not shown). The first AFE 20 processes the analog signal R_S received via the first antenna 10 using a component such as a filter to perform a receiving function, and outputs a processed analog signal R_I.

The ADC 30 converts the processed analog signal R_I into a digital reception signal D_S.

The first power calculator 40, the second power calculator 50, the attenuation controller 60, and the digital attenuator 110 and/or the analog attenuator 130 may be used such that the D/U ratio is within a range allowed by the interference cancellation repeater 100.

The first power calculator 40 calculates power of the digital reception signal D_S. Power of the digital reception signal D_S may be calculated by a root means square (RMS) value.

When the signal T_S output from the second antenna 150 of the interference cancellation repeater 100 is fed back to the first antenna 10, the digital filter 70, the delay unit 80, the adaptive filter 90, or the subtractor 91 may be used to cancel interference of a feedback signal.

The first power calculator 40, the second power calculator 50, the attenuation controller 60, the digital filter 70, the delay unit 80, the adaptive filter 90, the subtractor 91, and the digital attenuator 110 may be implemented by a single integrated circuit or by a part of a DSP.

The subtractor 91 subtracts an estimated signal F_S from the digital reception signal D_S and outputs an interference canceled signal C_S. The digital reception signal D_S, which is the signal T_S input to the interference cancellation repeater 100 again via the first antenna 10 after being output via the second antenna 150 of the interference cancellation repeater 100, includes a desirable signal and undesired interference.

The estimated signal F_S may be generated using the adaptive filter 90. The adaptive filter 90 adaptively filters the interference canceled signal C_S to generate the estimated signal F_S. Adaptive filtering means that the adaptive filter 90 outputs the estimated signal F_S using a signal (not shown) correlated with the undesired interference in the digital reception signal D_S and the interference canceled signal C_S. The filtering operation of the adaptive filter 90 is repeated until the interference canceled signal C_S is minimized. Since general operations of the adaptive filter 90 are well known to those of ordinary skill in the art, a detailed description thereof will not be given herein.

According to an example embodiment, the interference cancellation repeater 100 may further include the digital filter 70 for filtering the interference canceled signal C_S output from the subtractor 91. Here, the filtering may be a signal processing process for canceling signals outside a specific frequency band for transmission to the communication device 300 from the interference canceled signal C_S.

In addition, according to an example embodiment, the interference cancellation repeater 100 may further include the delay unit 80 for delaying a signal CF_S output from the digital filter 70. Here, a signal CF_D output from the delay unit 80 is input to the adaptive filter 90. The adaptive filter 90 may generate the estimated signal F_S using the signal CF_D output from the delay unit 80 instead of the interference canceled signal C_S.

The second power calculator 50 calculates power of the interference canceled signal C_S. Similar to the first power calculator 40, power of the interference canceled signal C_S may be calculated by the RMS value.

The attenuation controller 60 compares a power value P_S1 of the calculated digital reception signal D_S with a power value P_S2 of the calculated interference canceled signal C_S and determines an attenuation value of the interference canceled signal C_S according to the comparison result.

Figure 3:
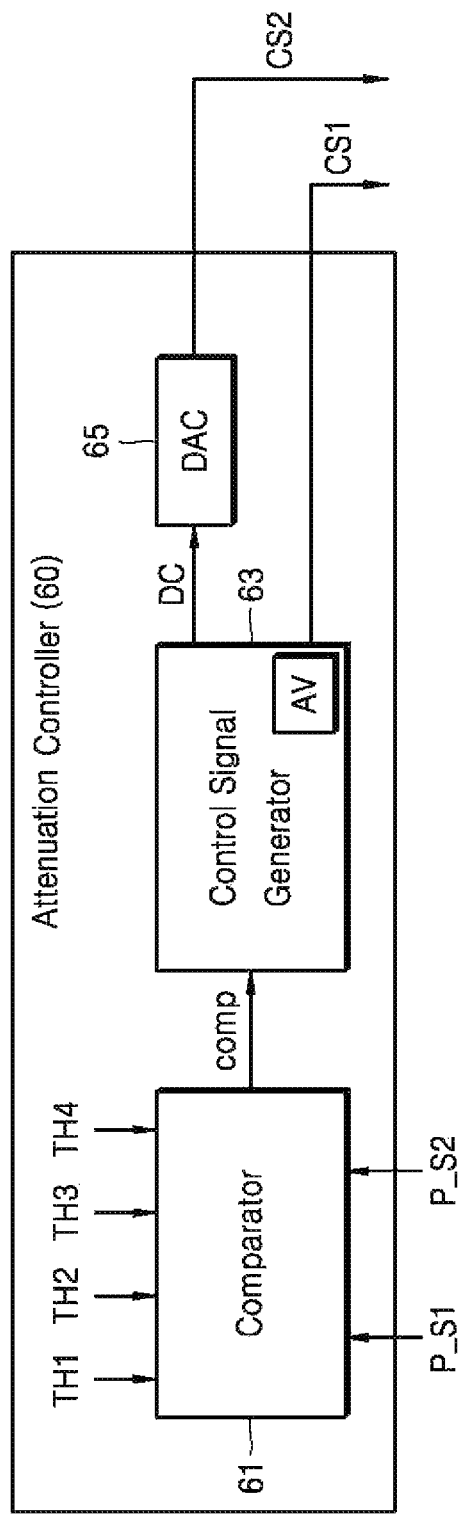
FIG. 3 is a block diagram of an example embodiment of an attenuation controller shown in FIG. 2.

FIG. 3 is a block diagram of an example embodiment of the attenuation controller 60 shown in FIG. 2.

Referring to FIGS. 1 through 3, the attenuation controller 60 compares a difference value between the power value P_S1 of the calculated digital reception signal D_S and the power value P_S2 of the calculated interference canceled signal C_S with at least one of threshold values TH1, TH2, TH3, and TH4 and determines an attenuation value AV of the interference canceled signal C_S according to the comparison result.

The attenuation controller 60 may include a comparator 61, a control signal generator 63, and a DAC 65. The comparator 61, the control signal generator 63, or the DAC 65 may be implemented by hardware such as a logic gate or by software such as a program code.

The comparator 61 compares the difference value between the power value P_S1 of the calculated digital reception signal D_S and the power value P_S2 of the calculated interference canceled signal C_S with at least one of the threshold values TH1, TH2, TH3, and TH4 to output a comparison signal COMP. The number of threshold values used in the comparator 61 is assumed to be four in the inventive concept, but is not limited thereto.

The comparator 61 compares the difference value between the power value P_S1 of the calculated digital reception signal D_S and the power value P_S2 of the calculated interference canceled signal C_S with each of the threshold values TH1, TH2, TH3, and TH4 to output the comparison signal COMP. A second threshold value TH2 may be greater than a first threshold value TH1, a third threshold value TH3 may be greater than the second threshold value TH2, and the third threshold value TH3 may be greater than a fourth threshold value TH4. The comparison signal COMP may be composed of 4 bits.

According to an example embodiment, the number of the threshold values TH1, TH2, TH3, and TH4 or the number of bits of the comparison signal COMP may vary.

For example, when the difference between the power value P_S1 of the calculated digital reception signal D_S1 and the power value P_S2 of the calculated interference canceled signal C_S is less than the first threshold value TH1, bit values of the comparison signal COMP may be 'H (high)', 'H (high)', 'H (high)', and 'H (high)', respectively.

The difference value between the power value P_S1 of the calculated digital reception signal D_S and the power value P_S2 of the calculated interference canceled signal C_S is greater than the first threshold value TH1 and less than the second threshold value TH2, bit values of the comparison signal COMP may be 'L (low)', 'H (high)', 'H (high)', and 'H (high)', respectively.

The difference value between the power value P_S1 of the calculated digital reception signal D_S and the power value P_S2 of the calculated interference canceled signal C_S is greater than the first threshold value TH1 and the second threshold value TH2 and less than the third threshold value TH3, bit values of the comparison signal COMP may be 'L (low)', 'L (low)', 'H (high)', and 'H (high)', respectively.

The difference value between the power value P_S1 of the calculated digital reception signal D_S and the power value P_S2 of the calculated interference canceled signal C_S is greater than the first threshold value TH1, the second threshold value TH2, and the third threshold value TH3 and less than the fourth threshold value TH4, bit values of the comparison signal COMP may be 'L (low)', 'L (low)', 'L (low)', and 'H (high)', respectively.

The difference value between the power value P_S1 of the calculated digital reception signal D_S and the power value P_S2 of the calculated interference canceled signal C_S is greater than the first threshold value TH1, the second threshold value TH2, the third threshold value TH3, and the fourth threshold value TH4, bit values of the comparison signal COMP may be 'L (low)', 'L (low)', 'L (low)', and 'L (low)', respectively.

The control signal generator 63 determines the attenuation value AV according to the comparison signal COMP and generates a first control signal CS1 and a digital control signal DC.

For example, when bit values of the comparison signal COMP are 'H (high)', 'H (high)', 'H (high)', and 'H (high)', respectively, the control signal generator 63 may determine the attenuation value AV to be 0 dB.

When bit values of the comparison signal COMP are 'L (low)', 'H (high)', 'H (high)', and 'H (high)', respectively, the control signal generator 63 may determine the attenuation value AV to be 10 dB.

When bit values of the comparison signal COMP are 'L (low)', 'L (low)', 'H (high)', and 'H (high)', respectively, the control signal generator 63 may determine the attenuation value AV to be 20 dB.

When bit values of the comparison signal COMP are 'L (low)', 'L (low)', 'L (low)', and 'H (high)', respectively, the control signal generator 63 may determine the attenuation value AV to be 32 dB.

When bit values of the comparison signal COMP are 'L (low)', 'L (low)', 'L (low)', and 'L (low)', respectively, the control signal generator 63 may determine the attenuation value AV to be 36 dB.

When the determined attenuation value is 0 dB, the control signal generator 63 may determine an attenuation value of the digital attenuator 110 and an attenuation value of the analog attenuator 130 to be 0 dB and 0 dB, respectively. The control signal generator 63 may generate the first control signal CS1 having a bit value '00' and the digital control signal DC having a bit value '00' according to the attenuation value of the digital attenuator 110 and the attenuation value of the analog attenuator 130.

When the determined attenuation value is 10 dB, the control signal generator 63 may determine an attenuation value of the digital attenuator 110 and an attenuation value of the analog attenuator 130 to be 2 dB and 8 dB, respectively. The control signal generator 63 may generate the first control signal CS1 having a bit value '10' and the digital control signal DC having a bit value '01' according to the attenuation value of the digital attenuator 110 and the attenuation value of the analog attenuator 130.

When the determined attenuation value is 20 dB, the control signal generator 63 may determine an attenuation value of the digital attenuator 110 and an attenuation value of the analog attenuator 130 to be 4 dB and 16 dB, respectively. The control signal generator 63 may generate the first control signal CS1 having a bit value '11' and the digital control signal DC having a bit value '10' according to the attenuation value of the digital attenuator 110 and the attenuation value of the analog attenuator 130.

When the determined attenuation value is 32 dB, the control signal generator 63 may determine an attenuation value of the digital attenuator 110 and an attenuation value of the analog attenuator 130 to be 0 dB and 32 dB, respectively. The control signal generator 63 may generate the first control signal CS1 having a bit value '00' and the digital control signal DC having a bit value '11' according to the attenuation value of the digital attenuator 110 and the attenuation value of the analog attenuator 130.

When the determined attenuation value is 36 dB, the control signal generator 63 may determine an attenuation value of the digital attenuator 110 and an attenuation value of the analog attenuator 130 to be 4 dB and 32 dB, respectively. The control signal generator 63 may generate the first control signal CS1 having a bit value '11' and the digital control signal DC having a bit value '11' according to the attenuation value of the digital attenuator 110 and the attenuation value of the analog attenuator 130.

The DAC 65 may convert the digital control signal DC into a second control signal CS2. The second control signal CS2 may be a plurality of analog voltages.

For example, when a bit value of the digital control signal DC is '00', the DAC 65 converts the bit value of the digital control signal DC into analog voltages having 0V, 0V, and 0V, respectively.

When a bit value of the digital control signal DC is '01', the DAC 65 converts the bit value of the digital control signal DC into analog voltages having 5V, 0V, and 0V, respectively.

When a bit value of the digital control signal DC is '10', the DAC 65 converts the bit value of the digital control signal DC into analog voltages having 0V, 5V, and 0V, respectively.

When a bit value of the digital control signal DC is '11', the DAC 65 converts the bit value of the digital control signal DC into analog voltages having 0V, 0V, and 5V, respectively.

Referring to FIG. 2, the digital attenuator 110 primarily attenuates the interference canceled signal C_S in response to the first control signal CS1. According to an example embodiment, when the interference cancellation repeater 100 includes the digital filter 70, the digital attenuator 110 may primarily attenuate the signal CF_S output from the digital filter 70 in response to the first control signal CS1. The signal CF_S output from the digital filter 70 is a signal obtained by filtering the interference canceled signal C_S in a specific frequency band.

The DAC 120 converts an attenuated digital signal DA_S output from the digital attenuator 110 into an analog signal AA_I.

The analog attenuator 130 secondarily attenuates the analog signal AA_I in response to the second control signal CS2.

For example, when the attenuation value AV determined by the attenuation controller 60 is 20 dB, an attenuation value of the interference canceled signal C_S attenuated by the digital attenuator 110 or the signal CF_S output from the digital filter 70 may be 4 dB, and a value attenuated by the analog attenuator 130 may be 16 dB.

That is, a signal AA_O output from the analog attenuator 130 is attenuated by 20 dB more than the interference canceled signal C_S or the signal CF_S output from the digital filter 70. The analog attenuator 130 may be implemented by a resistor array (not shown), and an analog selector (not shown).

The second AFE 140 processes the signal AA_O output from the analog attenuator 130 using a component such as a PA. The second antenna 150 transmits the analog signal T_S processed by the second AFE 140.

Figure 4:
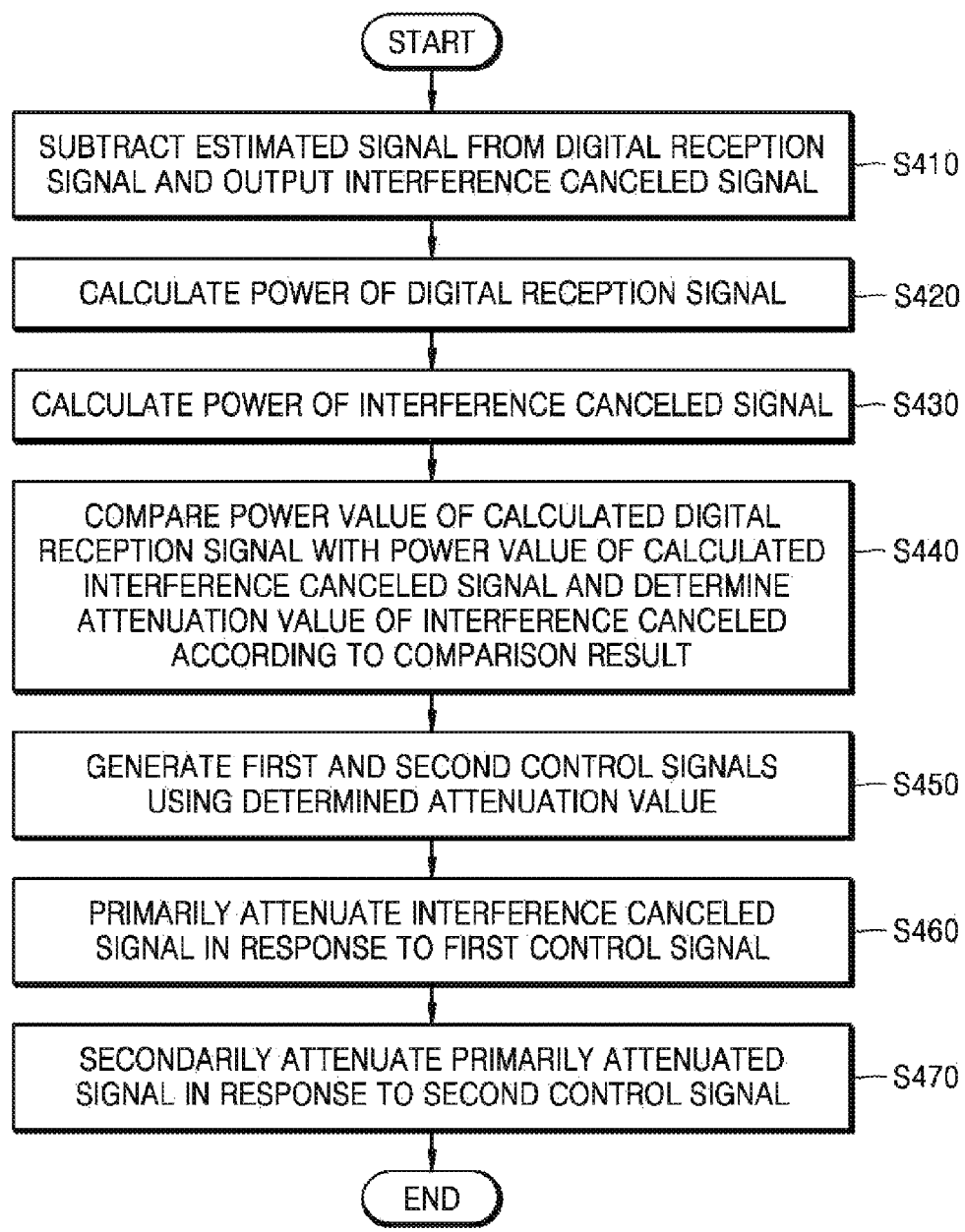
FIG. 4 is a flowchart of a method of attenuating signals of the interference cancellation repeater shown in FIG. 2.

FIG. 4 is a flowchart of a method of attenuating signals of the interference cancellation repeater 100 shown in FIG. 2. In some example embodiments, it should be noted that each of operations shown in FIG. 4 may be performed out of the order shown. For example, successive operations may be performed substantially concurrently or in a reverse order.

Referring to FIGS. 1 through 4, in operation S410, the subtractor 91 subtracts the estimated signal F_S from the digital reception signal D_S and outputs the interference canceled signal C_S.

In operation S420, the first power calculator 40 calculates power of the digital reception signal D_S.

In operation S430, the second power calculator 50 calculates power of the interference canceled signal C_S.

In operation S440, the attenuation controller 60 compares the power value P_S1 of the calculated digital reception signal D_S with the power value P_S2 of the calculated interference canceled signal C_S and determines the attenuation value AV of the interference canceled signal C_S according to the comparison result.

In more detail, the attenuation controller 60 compares a difference value between the power value P_S1 of the calculated digital reception signal D_S and the power value P_S2 of the calculated interference canceled signal C_S with at least one of the threshold values TH1, TH2, TH3, and TH4 to determine the attenuation value AV.

In operation S450, the attenuation controller 60 generates the first control signal CS1 and the second control signal CS2 using the determined attenuation value AV.

In operation S460, the digital attenuator 110 primarily attenuates the interference canceled signal C_S in response to the first control signal CS1.

In operation S470, the analog attenuator 130 secondarily attenuates analog signal AA-I that is corresponding to the primarily attenuated signal DA_S, in response to the second control signal CS2.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the disclosure as defined by the following claims.

What is claimed is:

1. An interference cancellation repeater comprising:
   a subtractor configured to subtract an estimated signal from a digital reception signal and output an interference canceled signal;
   a first power calculator configured to calculate power of the digital reception signal;
   a second power calculator configured to calculate power of the interference canceled signal; and
   an attenuation controller configured to compare the power of the digital reception signal with the power of the interference canceled signal and determine an attenuation of the interference canceled signal according to a comparison result.

2. The interference cancellation repeater of claim 1, wherein the attenuation controller is configured to compare a difference value between the power of the digital reception signal and the power of the interference canceled signal with at least one of threshold values to determine the attenuation value.

3. The interference cancellation repeater of claim 1, further comprising:
   a digital filter configured to filter the interference canceled signal output from the subtractor.

4. The interference cancellation repeater of claim 3, further comprising:
   an adaptive filter configured to adaptively filter the interference canceled signal filtered by the digital filter to generate the estimated signal.

5. The interference cancellation repeater of claim 4, further comprising:
   a delay unit configured to delay the interference canceled signal filtered by the digital filter and output the delayed interference canceled signal to the adaptive filter.

6. The interference cancellation repeater of claim 1, further comprising:
   a digital attenuator configured to primarily attenuate the interference canceled signal according to the determined attenuation value;
   a digital to analog converter (DAC) configured to convert digital signal output from the digital attenuator into an analog signal; and
   an analog attenuator configured to secondarily attenuate the analog signal according to the determined attenuation value.

7. An interference cancellation repeater comprising:
   a subtractor configured to subtract an estimated signal from a digital reception signal and output an interference canceled signal;
   a power calculator configured to calculate power of the digital reception signal and power of the interference canceled signal;
   an attenuation controller configured to compare the power of the digital reception signal with the power of the interference canceled signal and determine an attenuation of the interference canceled signal according to the comparison result;
   a digital attenuator configured to primarily attenuate the interference canceled signal according to the determined attenuation value;
   a digital to analog converter (DAC) configured to convert digital signal output from the digital attenuator into an analog signal; and
   an analog attenuator configured to secondarily attenuate the analog signal according to the determined attenuation value.

8. A method of attenuating signals of an interference cancellation repeater, the method comprising:
   subtracting an estimated signal from a digital reception signal and outputting an interference canceled signal;
   calculating power of the digital reception signal;
   calculating power of the interference canceled signal; and
   comparing the power of the digital reception signal with the power of the interference canceled signal and determining an attenuation of the interference canceled signal according to the comparison result.

9. The method of claim 8, wherein the determining an attenuation of the interference canceled signal comprises:
   comparing a difference value between the power of the digital reception signal and the power of the interference canceled signal with at least one of threshold values to determine the attenuation value.

10. The method of claim 8, further comprising:
    generating a first control signal and a second control signal using the determined attenuation value;
    primarily attenuating the interference canceled signal in response to the first control signal; and
    secondarily attenuating the primarily attenuated interference canceled signal in response to the second control signal.

* * * * *